(12) United States Patent
Bilac et al.

(10) Patent No.: US 6,504,694 B1
(45) Date of Patent: Jan. 7, 2003

(54) CIRCUIT BREAKER SYSTEM WITH ASM INSTANTANEOUS OVERCURRENT INDICATION

(75) Inventors: Mario Bilac, Lawrenceville, GA (US); Charles Randall Dollar, II, Norcross, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,631

(22) Filed: Nov. 5, 1999

(51) Int. Cl.$^7$ ................................................. H02H 3/08
(52) U.S. Cl. ....................................... 361/93.2; 361/96
(58) Field of Search ............................. 361/93.2, 96, 64, 361/72, 50

(56) References Cited

U.S. PATENT DOCUMENTS

| | | | |
|---|---|---|---|
| 4,347,541 A | * 8/1982 | Chen et al. | 361/50 |
| 4,442,472 A | * 4/1984 | Pang et al. | 361/96 |
| 4,751,605 A | * 6/1988 | Mertz et al. | 361/91 |
| 5,745,114 A | 4/1998 | King et al. | 345/352 |
| 5,905,616 A | 5/1999 | Lyke | 361/64 |
| 5,936,817 A | * 8/1999 | Matsko et al. | 361/72 |
| 6,289,267 B1 | * 9/2001 | Alexander et al. | 700/286 |
| 6,297,939 B1 | * 10/2001 | Bilac et al. | 361/64 |
| 6,310,753 B1 | * 10/2001 | Dollar et al. | 361/93.2 |

* cited by examiner

*Primary Examiner*—Stephen W. Jackson
*Assistant Examiner*—Zeev Kitov

(57) ABSTRACT

A circuit breaker system (100) providing application specific module (ASM) instantaneous overcurrent indication is disclosed herein (FIG. 5). A trip unit (110) included in the circuit breaker system (100) is powered by an external power supply unit (134) in the ASM (104). The circuit breaker system (100) includes transmitting an indication signal (130) from the trip unit (110) to the ASM (104) in response to an overcurrent condition. The indication signal (130) triggers a first controller (130) included in the ASM (104), the first controller (130) configured to cause the external power supply unit (134) to maintain power to the trip unit (110) for a first length for time sufficient to communicate a data corresponding to the overcurrent condition to the ASM (104). The output of the first controller (130) triggers a second controller (132) included in the ASM (104), the second controller (132) configured to cause the external power supply unit (134) to reset the trip unit (110) in readiness to respond to the next overcurrent condition. The data received by the ASM (104) may be processed to form a trip and overcurrent data set for display in a display unit (112).

21 Claims, 6 Drawing Sheets

CIRCUIT BREAKER SYSTEM WITH ASM INSTANTANEOUS OVERCURRENT INDICATION

BACKGROUND OF THE INVENTION

The present invention relates generally to circuit breaker systems. More particularly, the present invention relates to a circuit breaker system equipped to provide overcurrent protection and application specific module (ASM) instantaneous overcurrent indication.

Circuit breakers are used to protect electrical circuitry from damage due to an overcurrent condition, such as an overload, a relatively high level short circuit, or a ground fault condition. To perform this function, circuit breakers presently include a switch unit and a trip unit. The switch unit is coupled to the electrical circuitry (i.e., lines and loads) such that it can open or close the electrical path of this electrical circuitry. The switch unit includes a pair of separable contacts per phase, a pivoting contact arm per phase, an operating mechanism, and an operating handle.

For each phase, a first contact of the pair of separable contacts is supported and moveable by the pivoting contact arm and a second contact is substantially stationary. All of the pivoting contact arms are coupled to the operating mechanism, and the operating mechanism is coupled to the operating handle. The operating handle is substantially disposed on the outside of the switch unit. In this manner, the operating mechanism can simultaneously actuate the pivoting contact arms, thereby either engaging or disengaging the pairs of separable contacts, in response to manual manipulation of the operating handle (i.e., a switch). Thus, in the overcurrent condition, all the pairs of separable contacts are disengaged or tripped (i.e., opening the electrical circuitry), and when the overcurrent condition is no longer present, the circuit breaker can be reset such that all the pairs of separable contacts are engaged (i.e., closing the electrical circuitry).

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

There are two types of trip units: a thermal-magnetic trip unit and an electronic trip unit. The thermal-magnetic trip unit is a mechanical system that utilizes thermal or magnetic field changes in one or more components within the trip unit to sense the overcurrent condition. The electronic trip unit is an electronic system that includes, among others, circuitry, current transformers, and solid-state devices to sense the overcurrent condition. Because electronic trip units, referred to as ETUs, include solid state devices, they are capable of providing much more than just sensing the overcurrent condition.

For example, the circuit breaker employing the electronic trip unit can monitor and specify, among others, the various types of overcurrent trip conditions, such as a long time trip, a short time trip, an instantaneous trip, or a ground fault trip, and the load conditions at the time of trip, such as the overcurrent value and the overcurrent duration. Such information or data can be provided to an operator via a display, such as a liquid crystal display (LCD) included in the electronic trip unit, referred to as an LCD trip unit or an LCD ETU. Presently, however, the data processed by the electronic trip unit is prone to unreliability and/or degradation due to limitations in the data processing scheme and/or powering of the electronic trip unit.

Thus, there is a need for a circuit breaker capable of providing reliable overcurrent trip indication data. Further, there is a need for a circuit breaker system capable of acquiring, processing, and managing a variety of overcurrent trip indication data corresponding to a series of overcurrent conditions.

BRIEF SUMMARY OF THE INVENTION

One embodiment of the invention relates to a system for sensing and indicating an overcurrent condition in an electrical circuitry. The system includes a trip unit configured to sense the overcurrent condition. The system further includes a module coupled to the trip unit and configured to selectively control power to the trip unit in response to an indication signal transmitted from the trip unit. By selectively controlling the power to the trip unit, this permits communication of a data corresponding to the overcurrent condition and permits configuring the trip unit to sense a subsequent overcurrent condition.

Another embodiment of the invention relates to a method of providing an overcurrent protection and indication for an electrical circuitry. The method includes (a) sensing an overcurrent condition with a trip unit, and (b) initiating a trip to protect the electrical circuitry in response to the overcurrent condition. The method further includes (c) transmitting an indication signal to a module coupled to the trip unit, and (d) controlling a power to the trip unit by the module. The method still further includes (e) communicating a data corresponding to the overcurrent condition to the module.

Still another embodiment of the invention relates to a system for sensing and indicating an overcurrent condition in an electrical circuitry. The system includes means for sensing the overcurrent condition in the electrical circuitry. The system also includes means for communicating an indication signal and a data corresponding to the overcurrent condition. The means for sensing coupled is to the means for communicating. The system still further includes means for selectively controlling a power to the means for sensing and the means for communicating. The means for communicating is coupled to the means for selectively controlling.

BRIEF DESCRIPTION OF THE DRAWINGS

The preferred embodiment will become more fully understood from the following detailed description, taken in conjunction with the accompanying drawings, wherein like reference numerals denote like elements, in which.

DETAILED DESCRIPTION OF THE INVENTION

Figure 1:
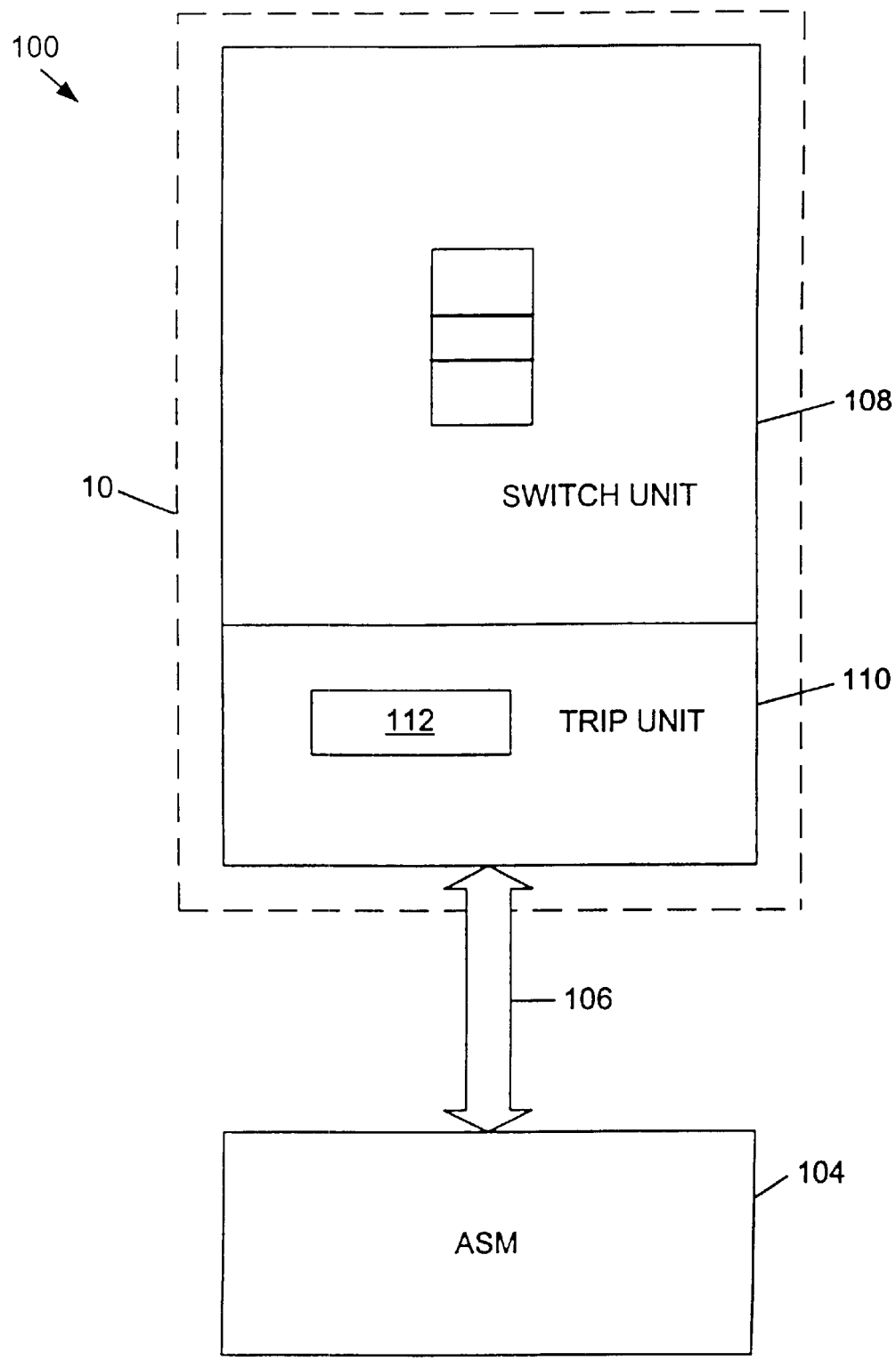
FIG. 1 is a block diagram of a circuit breaker system which employs an embodiment of the present invention.

Referring to FIG. 1, there is shown the major components of a circuit breaker system 100. System 100 includes a circuit breaker 10, an application specific module (ASM) 104, and a communication link 106. System 100 is configured to protect an electrical circuitry (not shown) connected thereto from overcurrent conditions, such as an overload, a short circuit, or a ground fault. System 100 is further configured to acquire, process, control, and communicate information or data relating to overcurrent trip conditions to other devices or to an operator.

Circuit breaker 10 includes a switch unit 108 proximate a trip unit 110. Trip unit 110 is preferably an electronic trip unit (ETU), and is more preferably a liquid crystal display (LCD) electronic trip unit (ETU), and includes a display unit 112, such as a LCD. Circuit breaker 10, and more preferably trip unit 110, communicates with ASM 104 via the communication link 106. Although not shown, system 100 can be coupled to a computer user interface, via a communication adapter, to provide further programmability, interrogation, and monitoring of system 100 and subcomponents therein such as ASM 104.

Figure 2:
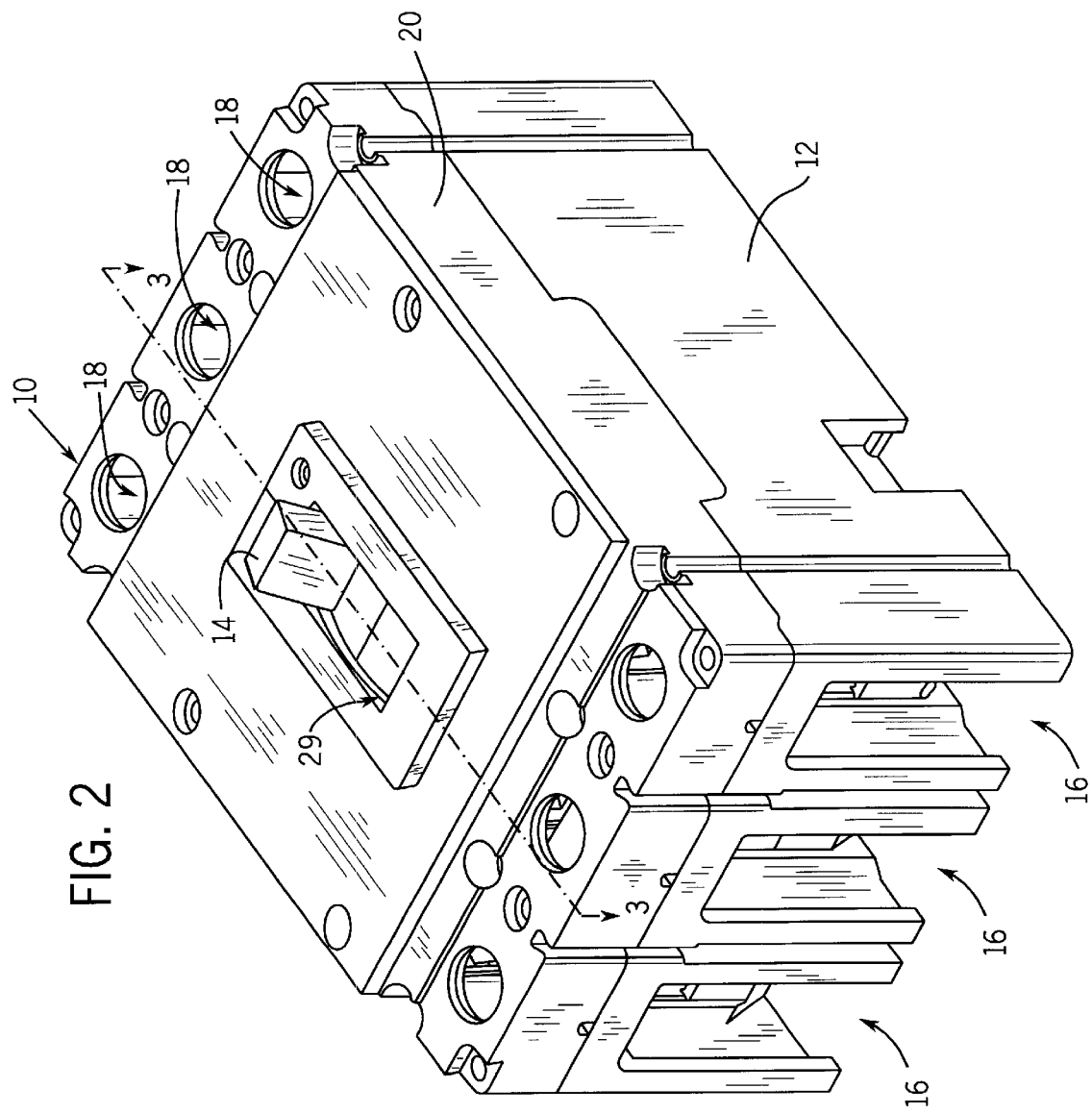
FIG. 2 is an isometric drawing of a circuit breaker which comprises a portion of the circuit breaker system of FIG. 1.
Figure 3:
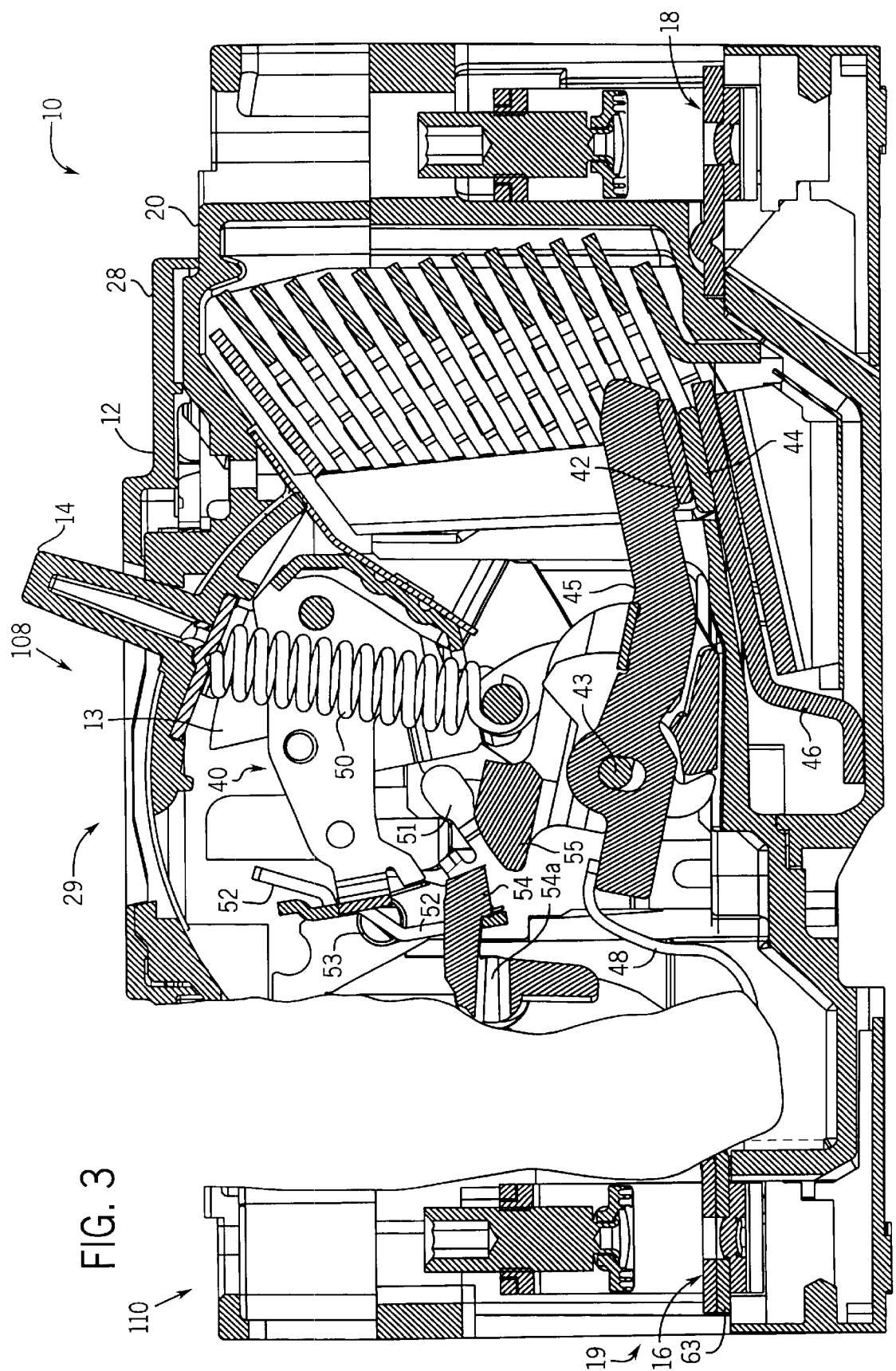
FIG. 3 is a cross-sectional view of the circuit breaker shown in FIG. 2 along the lines 3—3.

In FIGS. 2–3, one embodiment of circuit breaker 10 of system 100 is shown. Circuit breaker 10 is preferably a three phase or pole molded case circuit breaker having three sets of contacts for interrupting current in each of the three respective electrical transmission phases in the case of an overcurrent. Circuit breaker 10 includes an operating mechanism 40 which controls the switching of all three poles of the breaker. Alternatively, it is contemplated that circuit breaker 10 may be a single phase circuit breaker or other multi-phase circuit breaker.

Referring to FIG. 2, circuit breaker 10 includes a circuit breaker housing 12, an operating handle 14, load terminals 16, line terminals 18, a circuit breaker cover 20, and an opening 29. Opening 29 is provided on the top of cover 20 and configured to receive handle 14 therethrough such that handle 14 is moveable between an ON position, an OFF position, and a TRIPPED position. Cover 20 is integrally disposed over housing 12 and both are configured such that load and line connections can be accepted by load and line terminals 16, 18, respectively, disposed on opposite sides of circuit breaker 10. Cover 20 and housing 12 are preferably molded from an insulating material. Display unit 112 (not shown) would be visible from the top of cover 20 to provide information or data about circuit breaker 10.

Figure 4:
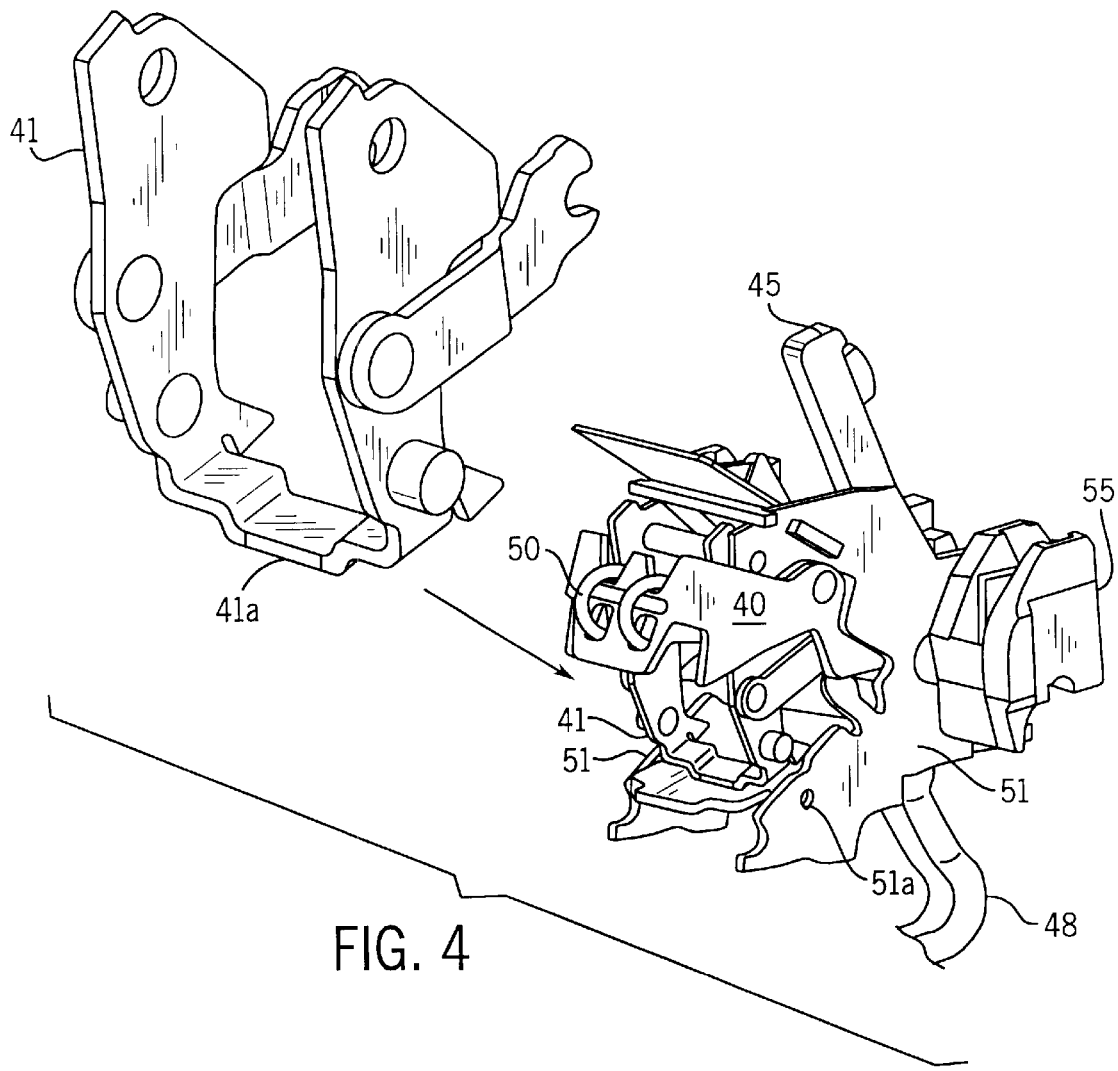
FIG. 4 is an exploded isometric drawing of an operating mechanism which comprises a portion of the circuit breaker shown in FIG. 2.

Referring to FIGS. 3–4, there is shown respectively, a cross-sectional view of circuit breaker 10, viewed along lines 3—3 as shown in FIG. 2, and an exploded isometric view of a portion of circuit breaker 10. Circuit breaker 10 includes an operating mechanism 40, operating mechanism 40 including a pivoting member 13 with the operating handle 14. Manual operation of circuit breaker 10 is accomplished by pivoting member 13 and handle 14 operable between the ON and OFF positions, within opening 29, to enable a contact operating mechanism 40 to engage and disengage a moveable contact 42 and a stationary contact 44 for each of the three phases, such that line terminal 18 and load terminal 16 of each phase can be electrically connected. Circuit breaker 10 further includes a fixed line contact arm 46 and a moveable load contact arm 45 for each of the three phases. Alternatively, circuit breaker 10 may have a moveable line contact arm to facilitate faster current interruption operation.

The moveable load contact arm 45 for each of the three phases are mechanically coupled together by an insulating cross bar member 55. The insulating cross bar member 55 is mechanically coupled to operating mechanism 40 so that, by moving handle 14 from left to right, cross bar 55 rotates in a clockwise direction and all three load contact arms 45 concurrently move to engage their corresponding line contact arms 46, thereby causing electrical contact between a moveable contact pad 42 and a stationary contact pad 44.

The operating mechanism 40 includes a cradle 41 (see FIG. 4) which engages an intermediate latch 52 to hold the contacts of circuit breaker 10 in a closed position unless and until an overcurrent condition occurs, in which case circuit breaker 10 is tripped. Intermediate latch 52 is preferably "Z" shaped, comprising an upper leg which includes a latch surface that engages cradle 41 and a lower leg which includes a latch surface that engages a trip bar 54. The center portion of intermediate latch 52 is angled with respect to the upper and lower legs and includes two tabs, which provide a pivot edge for insertion into a mechanical frame 51 (see FIG. 4). As shown in FIG. 3, intermediate latch 52 is coupled to a torsion spring 53, torsion spring 53 retained in mechanical frame 51 by the mounting tabs of intermediate latch 52. Torsion spring 53 biases the upper latch surface of intermediate latch 52 toward cradle 41 and at the same time biases trip bar 54 into a position which engages the lower latch surface of intermediate latch 52. Trip bar 54 pivots in a counter clockwise direction about an axis 54a, responsive to a current applied to an electromechanical interface unit in trip unit 110 (to be described in greater detail hereinafter), during an overcurrent condition. As trip bar 54 rotates in a counter clockwise direction, the latch surface on the upper portion of trip bar 54 disengages the latch surface on the lower portion of intermediate latch 52. When this disengagement occurs, intermediate latch 52 rotates in a counter clockwise direction due to the force of cradle 41 via operating mechanism 40. Preferably this force is provided by a tension spring 50. Tension is applied to tension spring 50 by moving handle 14 from the open position to the closed position. Alternatively, more than one tension spring 50 may be utilized.

As intermediate latch 52 rotates responsive to the upward force exerted by cradle 41, it releases the latch on operating mechanism 40, permitting cradle 41 to rotate in a clockwise direction. As cradle 41 is rotated, operating mechanism 40 is released and cross bar 55 rotates in a counter clockwise direction to move load contact arms 45 away from line contact arms 46.

During normal operation, current flows from line terminal 18 through line contact arm 46 and its stationary contact pad 44 to load contact arm 45 through its contact pad 42. Continuing through load contact arm 45, the current flows through a flexible braid 48 (or alternatively, an other connecting element between load contact arm 45 and trip unit 110) to a trip circuitry (not shown in FIG. 3) in trip unit 110 to load terminal 16. In this manner, when the current through circuit breaker 10 exceeds the rated current for circuit breaker 10, i.e., experiences an overcurrent condition, circuit breaker 10 can be tripped, i.e., opened, either manually from switch unit 108, via handle 14, or automatically from trip unit 110 via the electromechanical interface unit.

Figure 5:
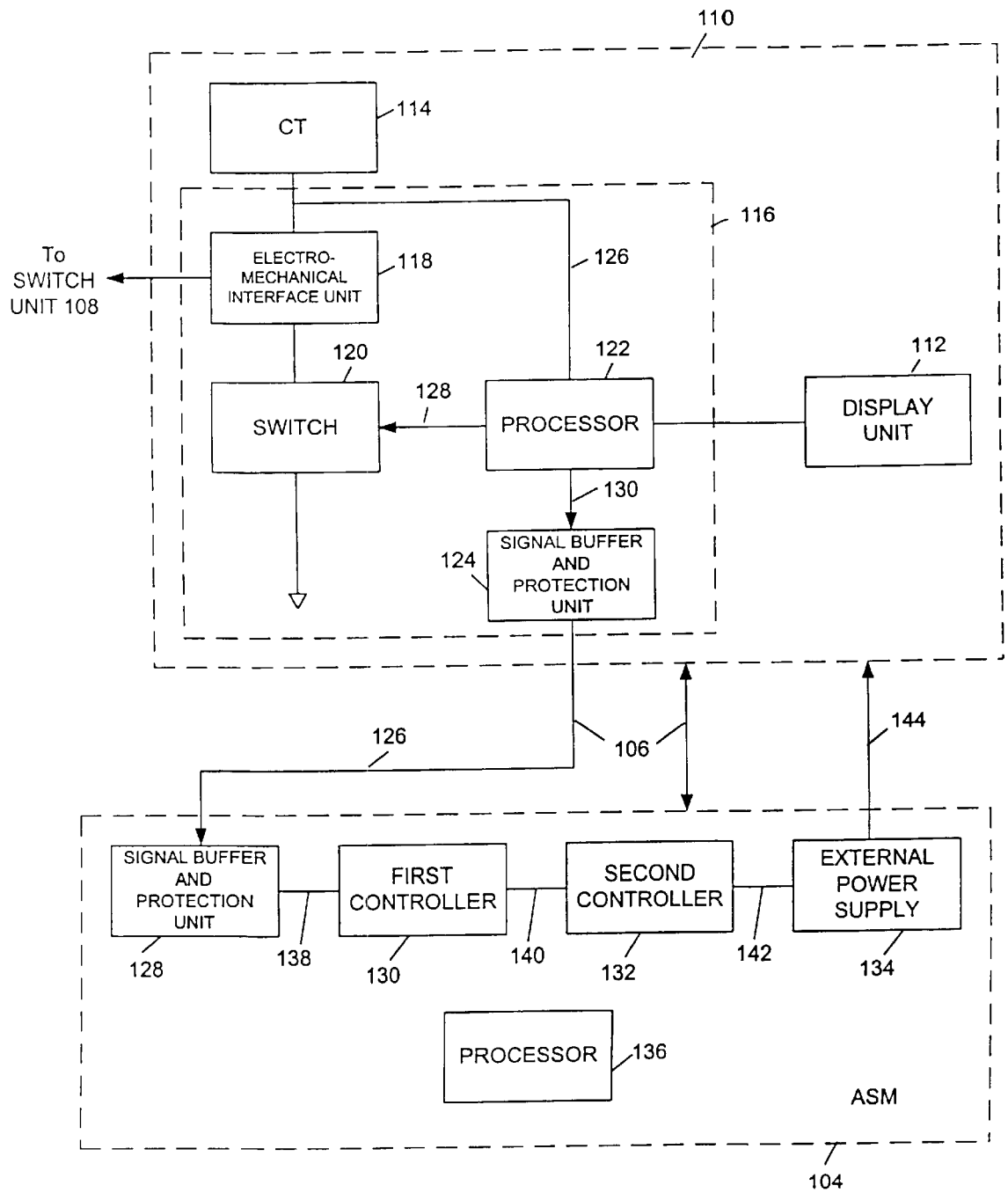
FIG. 5 is a block diagram showing a trip unit, a communication link, and an application specific module (ASM) which comprises a portion of the circuit breaker system of FIG. 1.

Referring to FIG. 5, there is shown a block diagram of an instantaneous electrical overprotection scheme and trip indication system. Trip unit 110 is located to the left of trip bar 54 shown in FIG. 3. Although not shown, trip unit 110 is modular and separable from switch unit 108. Trip unit 110 includes a current transformer (CT) 114 for each phase, a trip circuitry 116, the load terminal 16 for each phase, and the display unit 112.

Current transformer 114 for each phase relays an electrical condition in each of the respective poles, such as a current flowing between line terminal 18 and load terminal 16, and generates a sensed phase current signal corresponding to that electrical condition. The sensed phase current signals from all the phases are processed (not shown) such that they are combined into a single input signal 126 for trip circuitry 116. The input signal 126 is combined such that information relating to each phase is preserved. For example, the input signal 126 may include full-wave rectifying the sensed phase current signals.

Current transformer 114 for each phase is coupled to the trip circuitry 116. Trip circuitry 116 includes an electromechanical interface unit 118, a switch 120, a processor 122, and a signal buffer and protection unit 124. Current transformer 114 for each phase is coupled to the electromechanical interface unit 118 and to processor 122. Electromechanical interface unit 118 is coupled to switch 120, and switch 120 is coupled to processor 122. Processor 122 is also coupled to signal buffer and protection unit 124.

When processor 122 determines that the input signal 126 from current transformer 114 is representative of an overcurrent condition in any one of the phases, such as an overload, a short circuit, or a ground fault, processor 122 transmits a trip signal 128 to switch 120. Processor 122 also transmits an indication signal 130 to ASM 104.

When trip signal 128 is received by switch 120, switch 120 is configured to switch to a "close" position such that current will conduct through electromechanical interface unit 118. Switch 120 is preferably a silicon control rectifier (SCR) and trip signal 128 is received by a gate of the SCR. In turn, electromechanical interface unit 118 is configured to actuate operating mechanism 40 in switch unit 108 to disengage the load contact arms 45 from the line contact arms 46, thereby opening the circuit. More preferably, electromechanical interface unit 118 is configured to actuate the intermediate latch 52 in switch unit 108. Electromechanical interface unit 118 acts similar to a solenoid and extends a plunger to cause the trip. Preferably electromechanical interface unit 118 includes a magnetic latch (also referred to as a maglatch).

Indication signal 130 from processor 122 is received by the signal buffer and protection unit 124. Signal buffer and protection unit 124 is configured to provide signal buffering to indication signal 130 and to protect processor 122 from electro-static discharge (ESD). Preferably unit 124 is a Schmitt-trigger inverter. Alternatively, unit 124 may be a tranzorb or a zener diode, in which case instead of connecting unit 124 in series with processor 122, unit 124 would be connected to an electrical ground. Moreover, it is contemplated that the connection between trip unit 110 and ASM 104 to transmit indication signal 130 may be a pin connection such that ASM 104 may be separable from trip unit 110.

A buffered indication signal 126 is outputted from unit 124 and transmitted to ASM 104 via communication link 106. Communication link 106 can be one of a variety of communication interfaces, such as a coaxial cable, a fiber optic cable and a wireless transmission scheme, and is configured to provide a plurality of signal transmission pathways between trip unit 110 and ASM 104. Moreover, communication link 106 may be coupled to trip unit 110 and/or ASM 104 in a modular manner such as with pin connections.

ASM 104 includes a signal buffer and protection unit 128, a first trip unit power supply controller 130, a second trip unit power supply controller 132, a trip unit external power supply 134, and a processor 136. ASM 104, among others, provides a reliable and controllable external power supply to trip unit 110 at all times, including after a trip condition has occurred, such that trip unit 110 will be capable of sensing an overcurrent, initiating a trip, relaying the indication signal 130 to ASM 104, and communicating a variety of information or data about the trip to ASM 104, and to reset trip unit 110. Moreover, ASM 104 is configured to receive, process, and store the variety of information or data about the trip condition and communicate such data back to trip unit 110 for display.

Trip unit external power supply 134 preferably powers trip unit 110 at all times, i.e., during normal and trip conditions, via a power connection 144. Alternatively, trip unit 110 may be powered by current transformer 114, for example, when no ASM 104 is present or when there is a malfunction with the trip unit external power supply 134 or power connection 144. Power connection 144 may be coupled to trip unit 110 by a pin connection or by a direct connection, and may comprise a part of communication link 106.

When a trip condition occurs, ASM 104 is configured to manipulate and control the power to trip unit 110 such that information regarding the trip condition can be communicated and trip unit 110 can be reset to sense the next overcurrent condition. Buffered indication signal 126 is transmitted from trip unit 110 to the signal buffer and protection unit 128 via communication link 106. Unit 128 serves a similar function to unit 124, i.e., to provide signal buffering and protect ASM 104 from ESD. Unit 128 can be a Schmitt-trigger inverter, a tranzorb, or a zener diode. It is contemplated that unit 124 and/or unit 128 may be omitted, although preferably the presence of such circuit for trip unit 110 and ASM 104 insures better signal integrity and component protection.

A transmitted indication signal 138 outputted from unit 128 triggers the first trip unit power supply controller 130. First controller 130 is configured to cause the trip unit external power supply 134 to delay the power shut off of trip unit 110 for a fixed period of time after the trip condition has occurred. This time delay provides the necessary power and sufficient time for processor 122 in trip unit 110 to communicate with processor 136 in ASM 104 via communication link 106. A variety of information or data regarding the trip condition is relayed to processor 136 such as, but not limited to: a short time trip, an overload trip, a ground fault trip, an instantaneous trip, a trip overcurrent value, the phase(s) with the overcurrent, etc.

The output of first controller 130 is a stretched pulse or a delay signal 140, which is then transmitted to the second trip unit power supply controller 132. Delay signal 140 triggers the second controller 132, which is configured to cause the trip unit external power supply 134 to momentary shutoff power to trip unit 110, via a reset signal 142, to reset trip circuitry 116 following the trip occurrence. The length of the power shutoff is such that it is long enough for components within trip circuitry 116 to discharge yet short enough that a thermal memory associated with display unit 112 is not degraded nor erased. Accordingly, reset signal 142 is received by the trip unit external power supply 134 to trigger the momentary shut down of power across power connection 144.

ASM 104, more preferably processor 136, is configured to store the trip data corresponding to a plurality of trip occurrences. For example, ASM 104 may store the trip data corresponding to up to ten consecutive trip occurrences, i.e. maintaining a trip log. ASM 104 is also capable of processing the information or data received from trip unit 110 to provide additional information about the trip condition and/or circuit breaker 10. ASM 104 may provide a trip and overcurrent data set corresponding to each trip occurrence, such as, but is not limited to: a count of the overload trips, a count of the short time trips, a count of the ground fault trips, a count of the instantaneous trips, a count of breaker under load switching operations, a count of breaker ON-OFF or OFF-ON switching operations, a sum of $I^2T$ values, and a time stamp of each trip occurrence. In this manner, display unit 112 can display at least a portion of the trip and overcurrent data set by communicating with and receiving from ASM 104. It is contemplated that display unit 112 need not be coupled to processor 122 as is shown in FIG. 5. Instead, display unit 112 may include its own circuitry to accomplish its display and communication functions.

Figure 6:
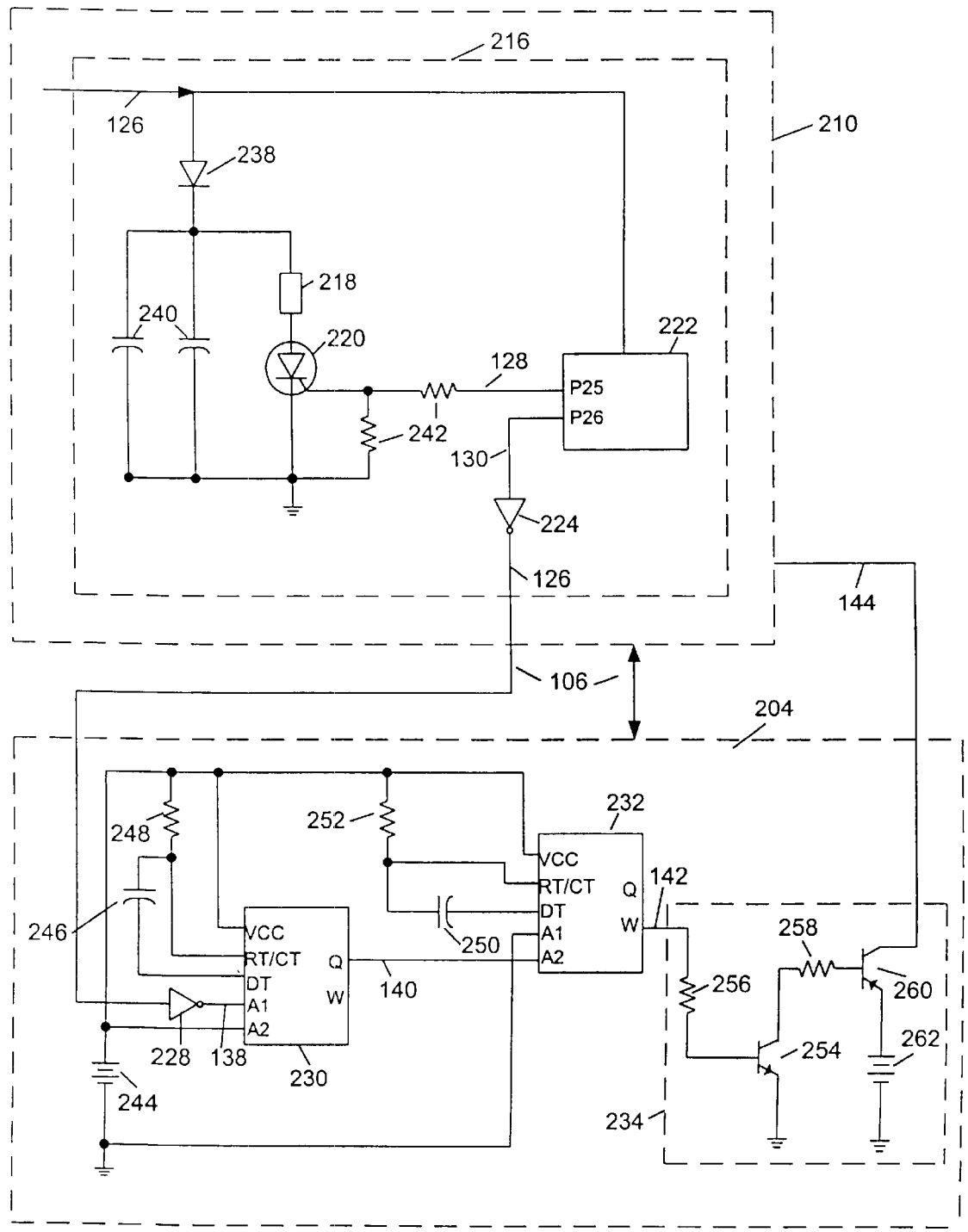
FIG. 6 is an electrical schematic diagram of the trip unit, the communication link, and the ASM which comprises a portion of the circuit breaker system of FIG. 1.

Referring to FIG. 6, there is shown an electrical schematic diagram of a circuit configured to provide another embodiment of the overcurrent protection and instantaneous trip indication discussed above. A trip circuitry 216 is included in a trip unit 210. Trip circuitry 216 includes an electromechanical interface unit 218, a switch 220, a processor 222, and a signal buffer and protection unit 224. When the input signal 126 from current transformer 114 is indicative of an overcurrent condition in at least one of the phases, processor 222 coupled to unit 218 initiates a trip by triggering switch 220 to a "close" position via trip signal 128. When switch 220 is its closed position, diode 238 and capacitors 240, each preferably having a value of 100 microFarads ($\mu$F), assist in conducting an appropriate amount of current through unit 218, thereby actuating intermediate latch 52. Unit 218 is preferably a maglatch, although any variety of electromechanical interfaces capable of actuating intermediate latch 52 in switch unit 108 is suitable.

Switch 220 is preferably a Motorola MCR70BA configured to switch close when a voltage of at least 0.7 volts is applied to its gate. This required voltage to the gate of the SCR is provided by trip signal 128, and resistors 242, each preferably having a value of 2.21 k$\Omega$, provide noise immunity to this gate.

Processor 222 is preferably an application specific integrated circuit (ASIC) or microcontroller. The ASIC can be an analog or digital component. As shown in FIG. 6, processor 222 is an ASIC including at least two output pins designated P25 and P26. The trip signal 128 is provided from P25 and the indication signal 130 is provided from P26. Indication signal 130 is received by the signal buffer and protection unit 224 and the buffered indication signal 126 is transmitted to an ASM 204 via communication link 106. Unit 224 is preferably a Schmitt-trigger inverter such as a Toshiba TC7W14FU.

ASM 204 includes a signal buffer and protection unit 228, a first trip unit power supply controller 230, a second trip unit power supply controller 232, and a trip unit external power supply 234. The transmitted indication signal 138 outputted from the signal buffer and protection unit 228 is received by first controller 230. Unit 228 is preferably a Schmitt-trigger inverter such as Toshiba TC7W14FU.

First controller 230 is preferably a monostable multivibrator such as a Motorola MC74HC4538A including five inputs designated VCC, RT/CT, DT, A1, and A2 and two outputs designated Q and W. The transmitted indication signal 138 is coupled to input A1, a capacitor 246 is coupled to input DT, and a resistor 248 is coupled to input RT/CT. In this embodiment, first controller 230 is configured to be a pulse stretcher, i.e., to output a pulse with a predetermined increased pulse width given an input pulse. In other words, by increasing the pulse width, a time delay can be introduced in which trip unit 210 will remain powered before trip unit 210 would be powered off in response to a trip occurrence. The pulse output width, and therefore the time delay, is determined by the values of capacitor 246 and resistor 248. For example, values for capacitor 246 and resistor 248 of 10 $\mu$F and 50k$\Omega$, respectively, result in a 500 millisecond (ms) time delay before power shutoff of trip unit 210. It is contemplated that other values of capacitor 246 and resistor 248 may be implemented as long as they provide a time delay sufficiently long enough for trip unit 210 to communicate all the desired trip data to ASM 204.

Delay signal 140 is outputted by output Q of first controller 230 to an input AZ of second controller 232. Similar to first controller 230, second controller 232 is also a monostable multivibrator including five inputs and two outputs. Second controller 232 is configured to reset trip circuitry 216 after a trip occurrence by causing toggling of the power to trip unit 210 "off" for a specified length of time, to discharge the components in trip circuitry 216, and then back "on" again, to sense the next overcurrent condition. Similarly, the power shut off time is determined by the values of capacitor 250, coupled to input DT, and resistor 252, coupled to input RT/CT. For example, values for capacitor 250 and resistor 252 of 1 $\mu$F and 10 k$\Omega$, respectively, result in a 10 ms power shut off time. It is contemplated that other values of capacitor 250 and resistor 252 may be implemented as long as enough power shut off time is provided to discharge the necessary components in trip circuitry 216 while pressurizing the thermal memory in trip unit 210. As another example, power shut off time could be 2 ms.

Reset signal 142 is outputted from output W of second controller 232 and is received by the trip unit external power supply 234. Reset signal 142 is utilized to trigger the momentary power shut off of trip unit 210 via a pair of field effect transistors (FETs) 254, 260 and a pair of resistors 256, 258 included in the trip unit external power supply 234.

Unit 228, first controller 230, and second controller 232 are biased by a direct current (DC) power source 244 in ASM 204, preferably at 5 volts. Similarly, trip unit external power supply 234 is biased by a DC power source 262 in ASM 204, in the range of 5.6 to 14.8 volts and more preferably at 9 volts.

It should be understood that the embodiments described herein are operable for circuit breakers with a range of current ratings, such as a current rating in the range of 15 to 1600 Amps. Moreover, it should be understood that the length of time that circuit breakers 10 is exposed to an overcurrent before the trip occurs depends in part on the severity of the overcurrent or alternatively, on how the trip curves have been set up. For example, a 120 Amp rated circuit breaker will trip a lot quicker for an overcurrent of 500 Amps than an overcurrent of 150 Amps.

While the embodiments and application of the invention illustrated in the FIGS. and described above are presently preferred, it should be understood that these embodiments are offered by way of example only. Other embodiments may include, for example, first and second trip unit power supply controllers 130, 132 replaced with a D-type flip-flop coupled to a microcontroller. Accordingly, the present invention is not limited to a particular embodiment, but extends to various modifications that nevertheless fall within the scope and spirit of the appended claims.

What is claimed is:

1. A system for sensing and indicating an overcurrent condition in an electrical circuitry, comprising:

a trip unit configured to sense the overcurrent condition;

a module coupled to the trip unit and configured to selectively control power to the trip unit in response to an indication signal transmitted from the trip unit, wherein selectively controlling the power to the trip unit permits communication of a data corresponding to the overcurrent condition and permits configuring the trip unit to sense a subsequent overcurrent condition, wherein the module includes a first controller configured to continue power to the trip unit for a first length of time after the overcurrent condition has been sensed by the trip unit; and a second controller configured to reset the trip unit after the data has been communicated, wherein the second controller is a monostable multivibrator and the trip unit is reset by toggling the power to the trip unit "off" for a second length of time and then "on."

2. The system of claim 1, wherein the second length of time is a length of time sufficient for the trip unit to discharge.

3. The system of claim 1, wherein the module includes an external power supply for the trip unit, the first controller receiving the indication signal and outputting a delay signal to the second controller and the second controller outputting a reset signal to the external power supply.

4. The system of claim 1, wherein the trip unit includes a processor and an electromechanical interface unit, the processor configured to transmit the indication signal to the module and to transmit a trip signal to the electromechanical interface unit to actuate tripping of the electrical circuitry.

5. The system of claim 4, wherein the indication signal is processed by at least one signal buffer and electro-static protection unit after output from the processor.

6. The system of claim 4, wherein the module includes a microcontroller configured to perform at least one of communicate with the processor, process the data from the trip unit into a trip and overcurrent data set, store the trip and overcurrent data set, and communicate the trip and overcurrent data set to a display unit.

7. The system of claim 6, wherein the trip and overcurrent data set includes at least one of an overload trip occurrence indication, a short time trip occurrence indication, a ground fault trip occurrence indication, an instantaneous trip occurrence indication, a count of the overload trip occurrences, a count of the short time trip occurrences, a count of the ground fault trip occurrences, a count of the instantaneous trip occurrences, a count of an under load switching operations, a sum of $I^2T$ values, and a time stamp of each trip occurrence.

8. A method of providing an overcurrent protection and indication for an electrical circuitry, comprising:

(a) sensing an overcurrent condition with a trip unit;

(b) initiating a trip to protect the electrical circuitry in response to the overcurrent condition;

(c) transmitting an indication signal to a module coupled to the trip unit;

(d) controlling a power to the trip unit by the module; and (e) communicating a data corresponding to the overcurrent condition to the module;

wherein step (d) of controlling the power includes resetting the trip unit after step (e) of communicating the data by toggling the power to the trip unit "off" for a second length of time and then "on."

9. The method of claim 8, wherein the second length of time is a length of time sufficient of the trip unit to discharge.

10. The method of claim 8, wherein steps (a) to (e) are repeated a plurality of times as desired to provide repeated overcurrent protection and indication.

11. The method of claim 8, further comprising at least one of:

(f) processing the data into a trip and overcurrent data set by a microcontroller included in the module;

(g) storing the trip and overcurrent data set in the module;

(h) communicating the trip and overcurrent data set to a display unit; and (i) displaying the trip and overcurrent data set on the display unit.

12. The method of claim 11, wherein step (i) of displaying includes at least one of displaying an overload trip occurrence indication, a short time trip occurrence indication, a ground fault trip occurrence indication, an instantaneous trip occurrence indication, a count of the overload trip occurrences, a count of the short time trip occurrences, a count of the ground fault trip occurrences, a count of the instantaneous trip occurrences, a count of an under load switching operations, a sum of $I^2T$ values, and a time stamp of each trip occurrence.

13. A system for sensing and indicating an overcurrent condition in an electrical circuitry, comprising:

means for sensing the overcurrent condition in the electrical circuitry;

means for communicating an indication signal and a data corresponding to the overcurrent condition, the means for sensing coupled to the means for communicating;

means for selectively controlling a power to the means for sensing and the means for communicating, the means for communicating coupled to the means for selectively controlling; and means for initiating a trip of the electrical circuitry in response to the overcurrent condition, the means for initiating coupled to the means for sensing and the means for communicating, wherein the means for selectively controlling includes a first monostable multivibrator coupled to a second monostable multivibrator and the second monostable multivibrator coupled to an external power supply for the means for communicating.

14. The system of claim 13, wherein the means for sensing includes a current transformer and the means for communicating includes a processor.

15. The system of claim 13, wherein the first monostable multivibrator receives the indication signal and outputs a delay signal, the first monostable multivibrator configured to cause the external power supply to maintain power to the means for communicating for a first length of time after the trip of the electrical circuitry.

16. The system of claim 15, wherein the first length of time is a length of time sufficient for the means for communicating to communicate the data to the means for selectively controlling.

17. The system of claim 15, wherein the second monostable multivibrator receives the delay signal and outputs a reset signal, the second monostable multivibrator configured to cause the external power supply to reset the means for communicating and the means for sensing by toggling the power "off" for a second length of time and then "on."

18. The system of claim 17, wherein the second length of time starts after the end of the first length of time and is a length of time sufficient for the means to sense to discharge.

19. The system of claim 13, further comprising means for signal buffering and protecting the indication signal in at least one of the means for communicating and the means for selectively controlling.

20. The system of claim 13, wherein the means for selectively controlling includes a microcontroller, wherein the microcontroller is configured to perform at least one of communicate with the means for communicating, process the data into a trip and overcurrent data set, store the trip and overcurrent data set, and communicate the trip and overcurrent data set to a means for displaying.

21. The system of claim 20, wherein the trip and overcurrent data set includes as least one of an overload trip occurrence indication, a short time trip occurrence indication, a ground fault trip occurrence indication, an instantaneous trip occurrence indication, a count of the overload trip occurrences, a count of the short time trip occurrences, a count of the ground fault trip occurrences, a count of the instantaneous trip occurrences, a count of an under load switching operations, a sum of $I^2T$ values, and a time stamp of each trip occurrence.

\* \* \* \* \*